(No Model.)
J. S. KURTZ.
GATE.
No. 432,314. Patented July 15, 1890.
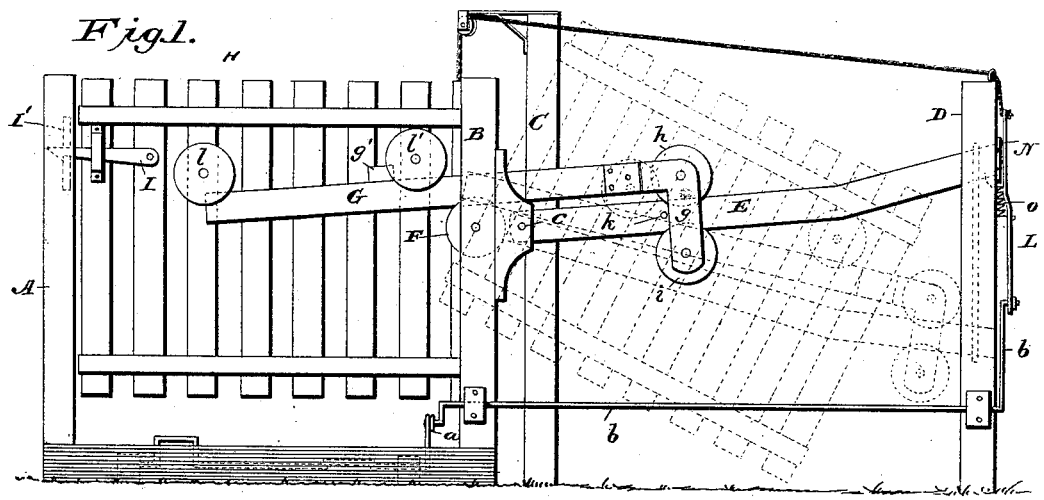
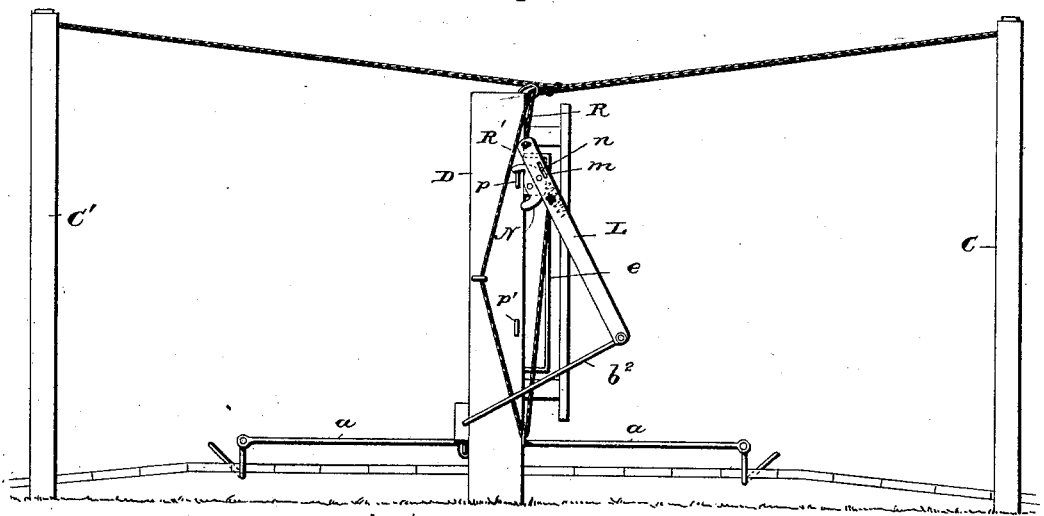
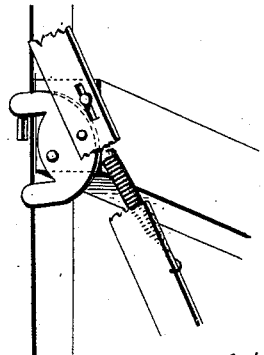
Witnesses
G. S. Elliott.
C. W. Johnson.
John S. Kurtz.
Inventor
By his Attorneys

UNITED STATES PATENT OFFICE.

JOHN S. KURTZ, OF RICHFIELD, PENNSYLVANIA.

GATE.

SPECIFICATION forming part of Letters Patent No. 432,314, dated July 15, 1890.

Application filed April 3, 1890. Serial No. 346,426. (No model.)

*To all whom it may concern:*

Be it known that I, JOHN S. KURTZ, a citizen of the United States of America, residing at Richfield, in the county of Juniata and State of Pennsylvania, have invented certain new and useful Improvements in Gates; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to certain new and useful improvements in gates of that class which roll or slide upon a bar inclined by levers or other means, so that the bar which operates the gate can be raised or lowered by persons in carriage or upon foot; and it consists in the construction and combination of the parts, as will be hereinafter fully set forth, and particularly pointed out in the claims.

In the accompanying drawings, Figure 1 is a side view showing the gate closed in full lines and open in dotted lines. Fig. 2 is a rear elevation. Fig. 3 is an enlarged detail view of the operating-arm, catch-plate, and adjacent parts.

A, B, C, C', and D refer to vertical posts, which are rigidly planted in the ground or secured to a base-frame. The gateway or passage between the posts A and B at suitable distance from said posts may be provided with the usual crank-arms for operating the pivoted bar upon which the gate is mounted, so that said bar will be lowered to open the gate or raised to close the same by the passage of a vehicle over said crank-arms, and these crank-arms are connected by bars $a$ to a rock-bar $b$, journaled in suitable bearings, to the posts B and D, as shown, and the rock-bar connects with the rods $a$ by a short bend and to the operating-link by a long bend, as will be hereinafter set forth.

The post B, at one side of the gateway, is provided with a block, through which passes a pivot-pin $c$, which secures thereto one end of the bar E, the upwardly-curved end of said bar passing beneath a bail or keeper $e$, secured to the side of the post D. In front of the pivoted bar E is secured a roller F, upon which rests a straight bar G, having secured at one end angle-irons $g$, which project from said bar G and extend downwardly over the bar E, and between these angle-irons are journaled flanged rollers $h$ and $i$, which are disposed so as to be located above and below the bar E. On the bar E are projecting pins or stops $k$, which engage with the angle-irons $g$ and limit the movement of the bar G across the gateway. This bar G rests on roller F, while the gate H has journaled thereto flanged rollers $l$ and $l'$, which travel on the upper edge of the bar G, which bar is provided with a stop $g'$, against which the flanged rollers $l$ and $l'$ strike to limit the sliding movement of the gate.

A pivoted latch I is secured to the outer end of the gate and engages with a catch I', secured to the post A. This latch I' is open at its upper end, so that when the gate is raised the pivoted latch will be released therefrom.

The long end $b^2$ of the rock-bar $b$ is pivotally connected to the lower end of a pivoted arm L. This arm L has a slot $m$, through which passes a headed pin $n$, seated in the end of bar E, and said arm is pivotally connected to a double catch-plate N, which in turn is pivoted to the end of the bar E, and this arm is also connected to the bar E by a spring $o$. The double latch or catch N engages with projections $p$ and $p'$ on the rear side of the post D when the gate is opened or closed or the bar E raised or lowered, and the spring $o$ has a tendency to throw the lower or long end of the arm L outwardly, or from the post. Cords R and R', with suitable connections, are secured to the arm L above and below where it is connected with the bar E and pass through suitable guides or pulleys to the top of the post D, where branch cords extend to and through supports carried by the posts C and C' for the purpose of releasing the double catch N and raising or lowering the pivoted arm E to open or close the gate manually. The gate can also be opened or closed by a vehicle-wheel passing over the crank-shafts, which operate the double-crank shaft $b$ to elevate or depress the long end $b^2$ thereof and operate the arm L and catches in the same manner as is done by the cords.

It will be noted that the double catch N is pivoted to the end of the bar E and that the arm L is pivoted to this double catch, and the movement of this arm L is limited by the slot $m$ and pin $n$, so that as the arm is moved either by the cords or crank-arms the catch will be actuated to engage with the pins $p\,p'$. This form of catch, in connection with the arm L, is applicable to any style of gate which moves upon a pivoted bar, and will serve to hold the free end of the pivoted bar locked when the gate is either open or closed.

Having thus described my invention, what I claim as new, and desire to secure by Letters Patent, is—

1. In combination with a gate supported partially or wholly upon a pivoted bar, a latch pivotally attached to said bar, an arm pivoted to the latch and provided with means for limiting the movement thereof, means connected to the arm for moving the same and actuating the latch, and catches with which the latch engages to hold the bar either elevated or depressed, substantially as set forth.

2. In combination with a sliding gate mounted on a pivoted bar E, a double latch I, pivoted to said bar, and an arm L, pivotally secured to said latch to one side of its pivot-point, a slot and pin for limiting the movement of the arm, and a spring secured to the arm and bar E, and catches attached to the post with which the latch engages, and means connected with the arm L for turning the same upon its pivot to operate the latch and lower the pivoted bar, substantially as shown, and for the purpose set forth.

3. The combination, with a sliding gate, of a curved bar E, pivoted to a fixed support, a sliding bar G, having rollers $h$ and $i$ for supporting one end of the same upon the bar E, and a roller F for engaging with the central portion of said bar G, rollers $l$ and $l'$, carried by the gate and adapted to engage with the upper edge of the bar G, and a stop for limiting the movement of the gate upon said bar, substantially as set forth.

4. The combination, in a sliding gate, of a pivoted bar E, curved as shown, and provided at its free end with means for elevating and lowering the same, a sliding bar G, mounted thereon, a gate H, having rollers $l$ and $l'$ at different elevations, said rollers engaging with the upper edge of the sliding bar G, stops $g'$ and $k$ for limiting the movement of the gate and sliding bar, a latch I, carried by the outer end of the gate and engaging with the fixed catch, and means, substantially as shown, for elevating and depressing the free end of the curved bar E, the parts being organized so that the gate will be first elevated to release the latch I and then automatically moved across the gateway, substantially as set forth.

In testimony whereof I affix my signature in presence of two witnesses.

JOHN S. KURTZ.

Witnesses:
JOHN BERGEY,
G. W. BURCHFIELD.